US010636130B2

(12) United States Patent
Matono et al.

(10) Patent No.: US 10,636,130 B2
(45) Date of Patent: Apr. 28, 2020

(54) IMAGE PROCESSING DEVICE

(71) Applicant: Hitachi Automotive Systems, Ltd., Hitachinaka-shi, Ibaraki (JP)

(72) Inventors: Haruki Matono, Tokyo (JP); Takeshi Nagasaki, Hitachinaka (JP); Toshiyuki Aoki, Tokyo (JP); Seiji Murata, Tokyo (JP); Masayuki Takemura, Tokyo (JP); Keiichi Betsui, Tokyo (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 202 days.

(21) Appl. No.: 15/567,905

(22) PCT Filed: Apr. 13, 2016

(86) PCT No.: PCT/JP2016/061866
§ 371 (c)(1),
(2) Date: Oct. 19, 2017

(87) PCT Pub. No.: WO2016/171050
PCT Pub. Date: Oct. 27, 2016

(65) Prior Publication Data
US 2018/0150949 A1    May 31, 2018

(30) Foreign Application Priority Data

Apr. 24, 2015    (JP) ................. 2015-089552

(51) Int. Cl.
  *G06T 5/50*    (2006.01)
  *G01C 3/06*    (2006.01)
  (Continued)

(52) U.S. Cl.
  CPC ................ *G06T 5/50* (2013.01); *G01C 3/06* (2013.01); *G06T 1/00* (2013.01); *G06T 3/00* (2013.01);
  (Continued)

(58) Field of Classification Search
  CPC ... G06T 1/00; G06T 3/00; G06T 2207/10016; G06T 7/246; G06T 7/0004
  See application file for complete search history.

(56) References Cited

U.S. PATENT DOCUMENTS 7,136,228 B2 * 11/2006 Tanijiri ............ G02B 5/10
                                                      359/631
7,643,552 B2 *  1/2010 Saishu ........... H04N 13/111
                                                      375/240.01

(Continued)

FOREIGN PATENT DOCUMENTS

EP    1 858 252 A2    11/2007
EP    2 221 652 A1     8/2010

(Continued)

OTHER PUBLICATIONS

Japanese-language Office Action issued in counterpart Japanese Application No. 2015-089552 dated Mar. 12, 2019 with English translation (eight (8) pages).

(Continued)

*Primary Examiner* — Yosef Kassa
(74) *Attorney, Agent, or Firm* — Crowell & Moring LLP

(57) ABSTRACT

An image processing device processes an image captured by at least one image-capturing device including a lens which has characteristics of including an inflection point of a change rate of an incidence angle per image height with respect to the incidence angle at a predetermined inflection point incidence angle. The image processing device includes a resolution adjustment unit that adjusts resolution of an inflection point correspondence image area corresponding to the predetermined inflection point incidence angle and resolution of at least one of an inside image area positioned more inside than the inflection point correspondence image area (Continued)

and an outside image area positioned outside of the inflection point correspondence image area.

5 Claims, 15 Drawing Sheets

(51) Int. Cl.
    *H04N 5/232*     (2006.01)
    *G06T 3/00*     (2006.01)
    *H04N 5/225*     (2006.01)
    *G06T 1/00*     (2006.01)
    *G06T 7/80*     (2017.01)
    *G02B 13/18*     (2006.01)
    *G02B 13/00*     (2006.01)

(52) U.S. Cl.
    CPC .............. *G06T 7/85* (2017.01); *H04N 5/225* (2013.01); *H04N 5/232* (2013.01); *G02B 13/00* (2013.01); *G02B 13/18* (2013.01)

(56) References Cited

U.S. PATENT DOCUMENTS

| | | | | |
|---|---|---|---|---|
| 7,865,002 | B2* | 1/2011 | Basilico | G06T 7/0012 378/37 |
| 8,085,337 | B2* | 12/2011 | Onuki | H04N 5/23212 348/222.1 |
| 8,189,272 | B1* | 5/2012 | Huang | G02B 13/004 359/715 |
| 8,447,098 | B1* | 5/2013 | Cohen | G06K 9/00 382/154 |
| 8,451,352 | B2* | 5/2013 | Hayasaka | G02B 3/0056 348/267 |
| 2004/0169726 | A1 | 9/2004 | Moustier et al. | |
| 2004/0257677 | A1 | 12/2004 | Matsusaka | |

FOREIGN PATENT DOCUMENTS

| | | |
|---|---|---|
| JP | 2004-354572 A | 12/2004 |
| JP | 2004-536351 A | 12/2004 |
| JP | 2005-010521 A | 1/2005 |
| JP | 2006-343545 A | 12/2006 |
| JP | 2010-283567 A | 12/2010 |

OTHER PUBLICATIONS

Extended European Search Report issued in counterpart European Application No. 16783071.0 dated Sep. 7, 2018 (eight (8) pages).
International Search Report (PCT/ISA/210) issued in PCT Application No. PCT/JP2016/061866 dated Jun. 21, 2016 with English translation (four (4) pages).
Japanese-language Written Opinion (PCT/ISA/210) issued in PCT Application No. PCT/JP2016/061866 dated Jun. 21, 2016 (four (4) pages).

* cited by examiner

[Fig. 1]
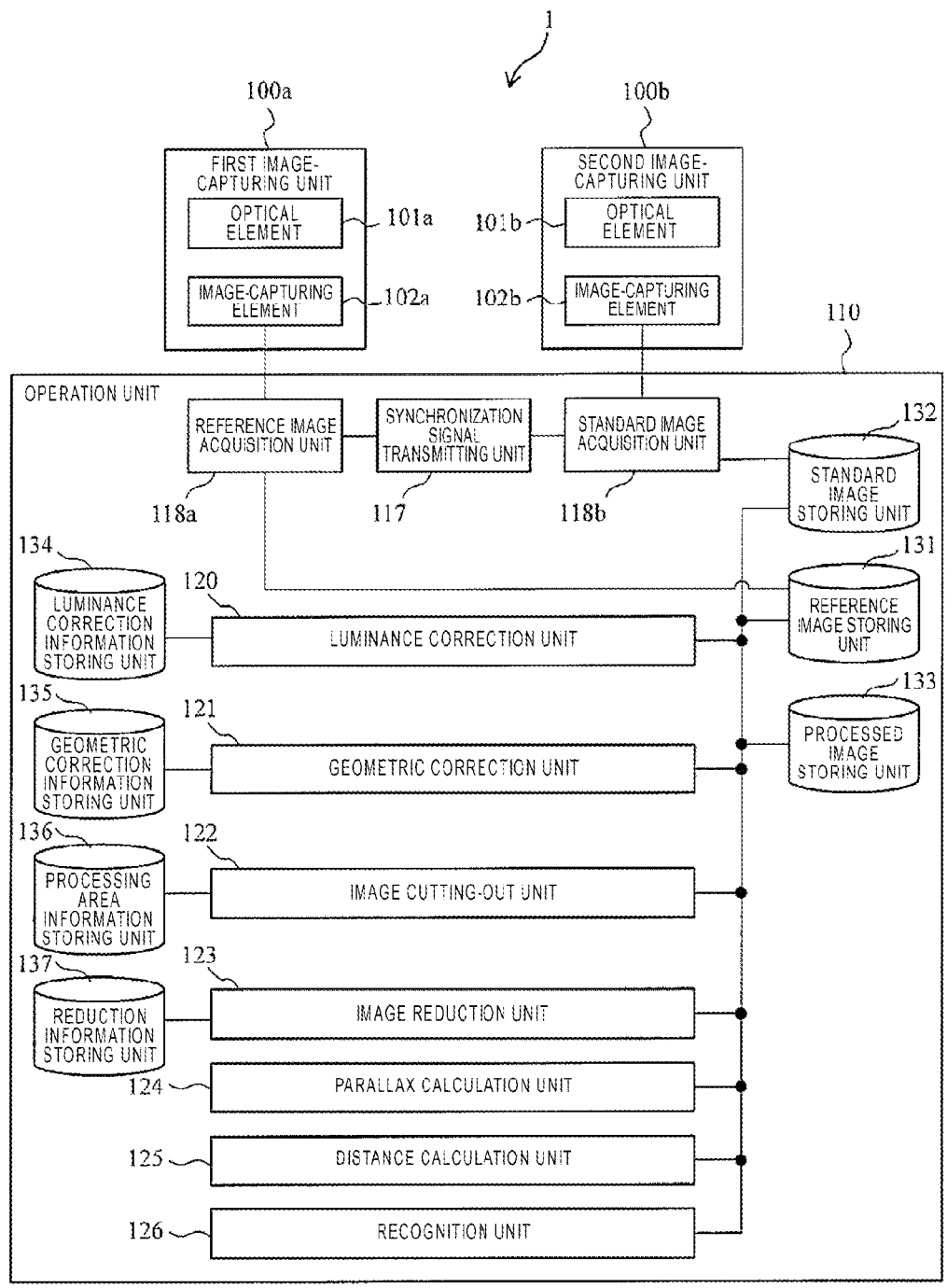

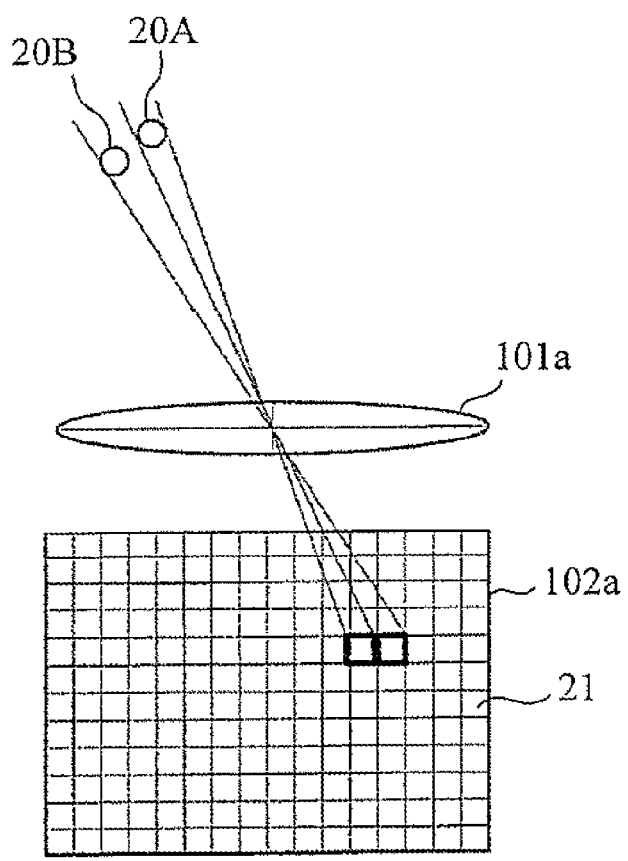
[Fig. 2A]

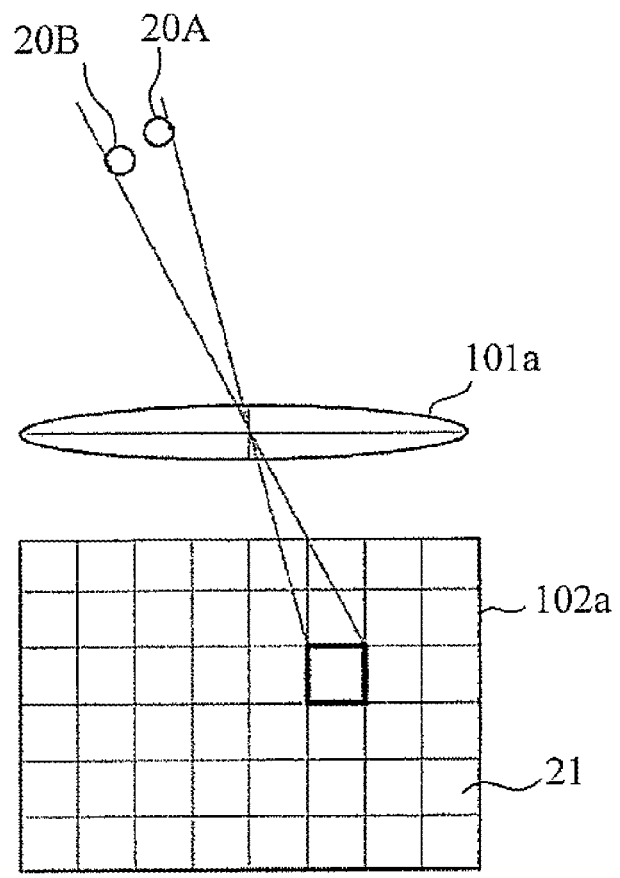
[Fig. 2B]

[Fig. 3]
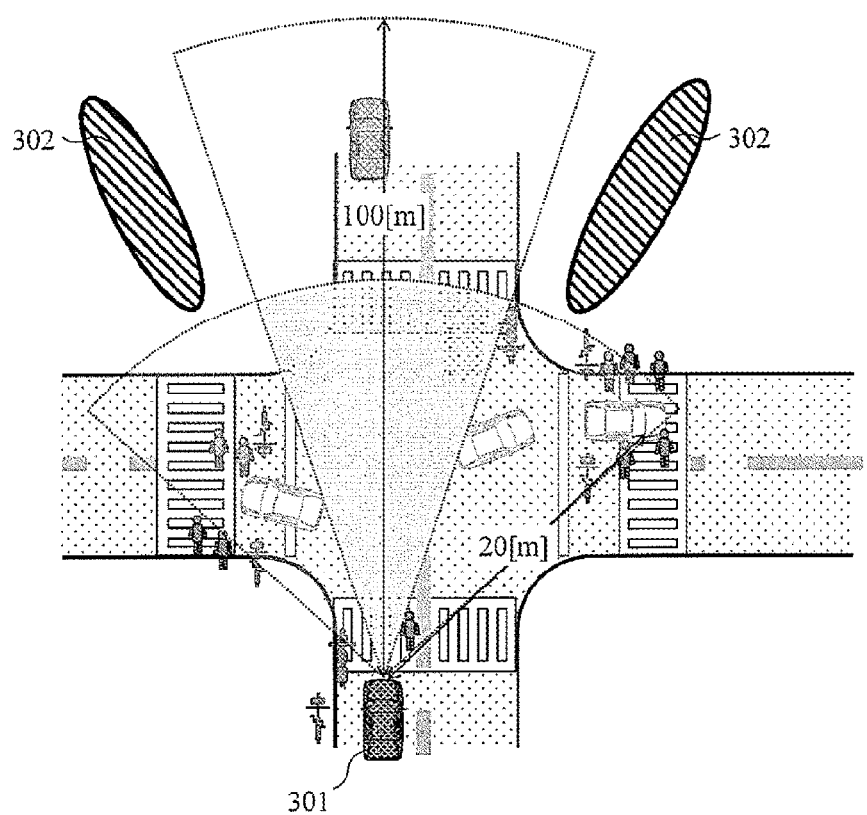

[Fig. 4]
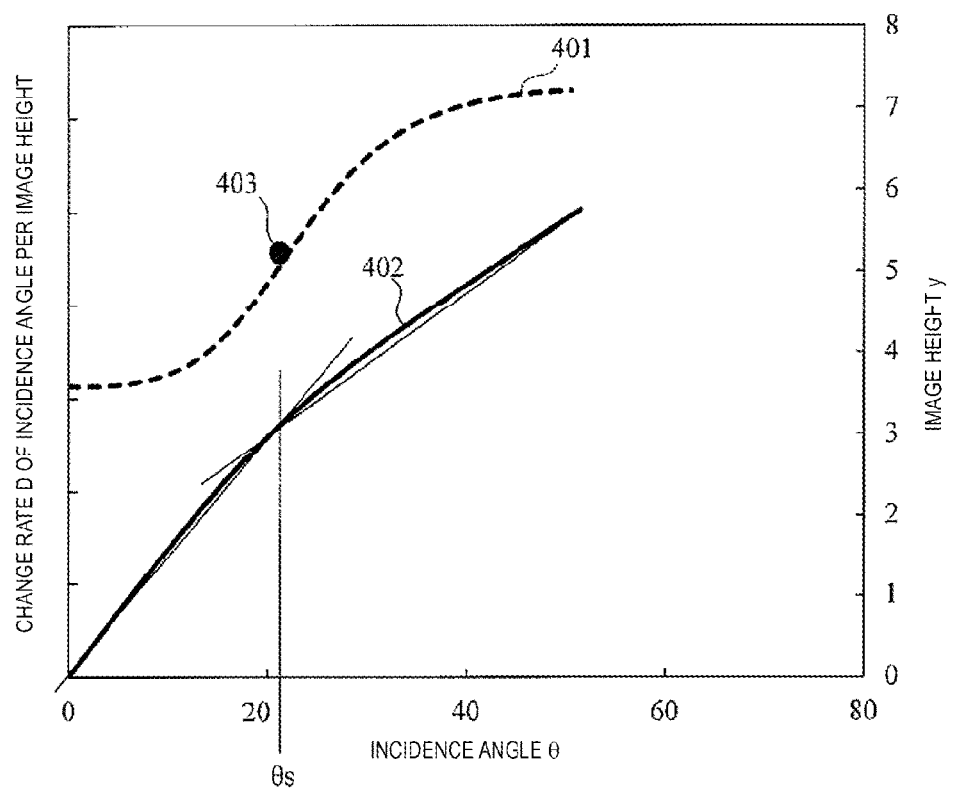

[Fig. 5]
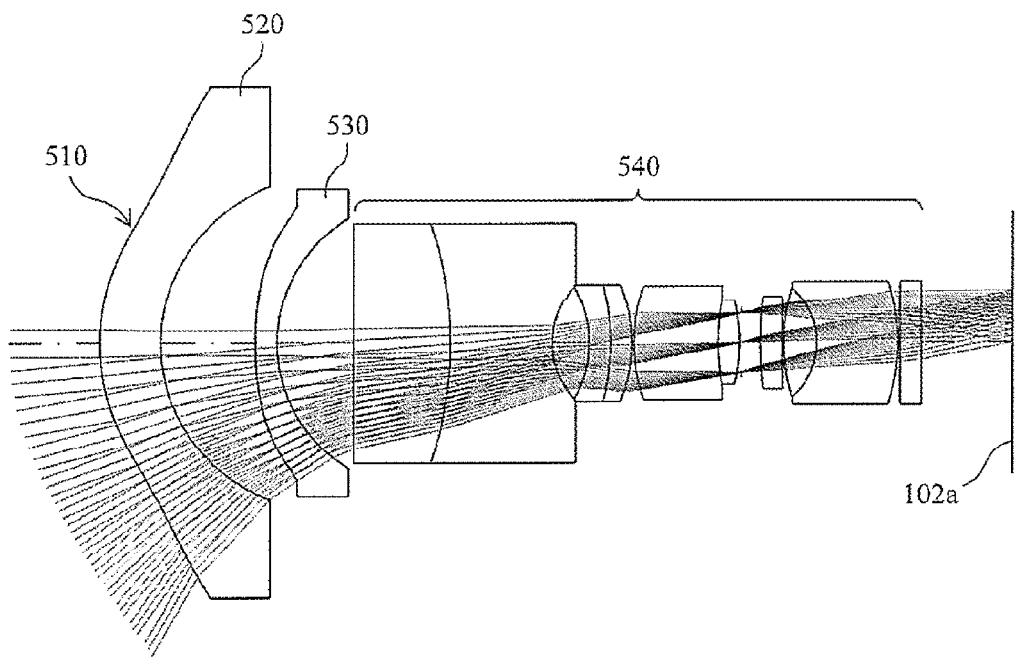
[Fig. 6]
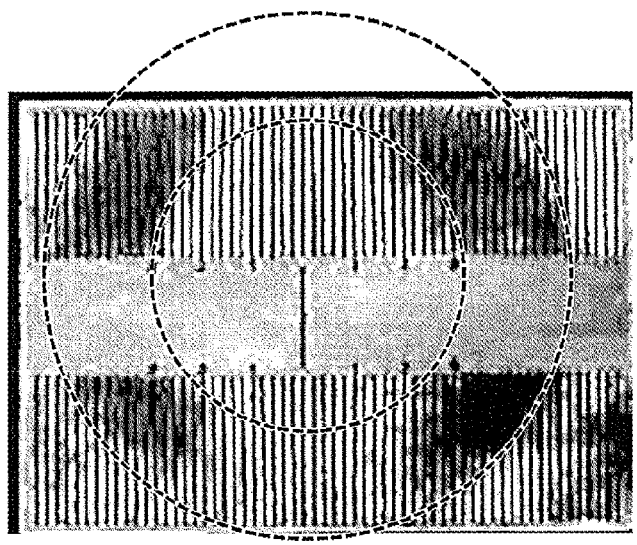

[Fig. 7]
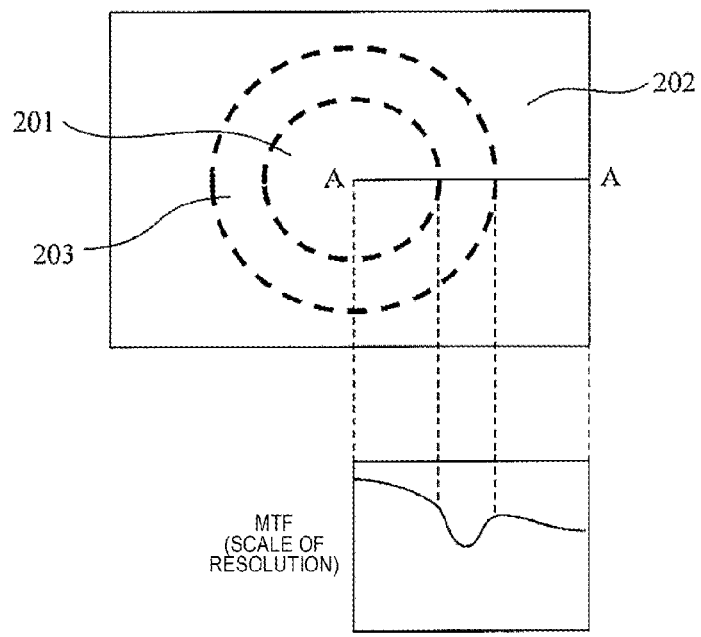
MTF
(SCALE OF
RESOLUTION)
[Fig. 8]
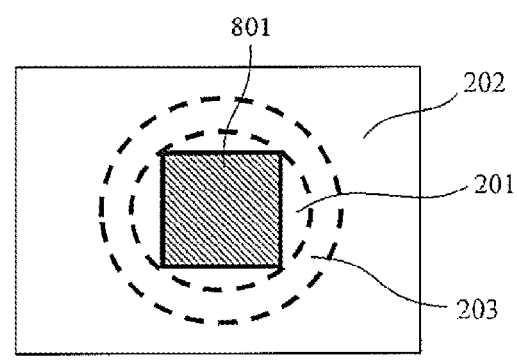

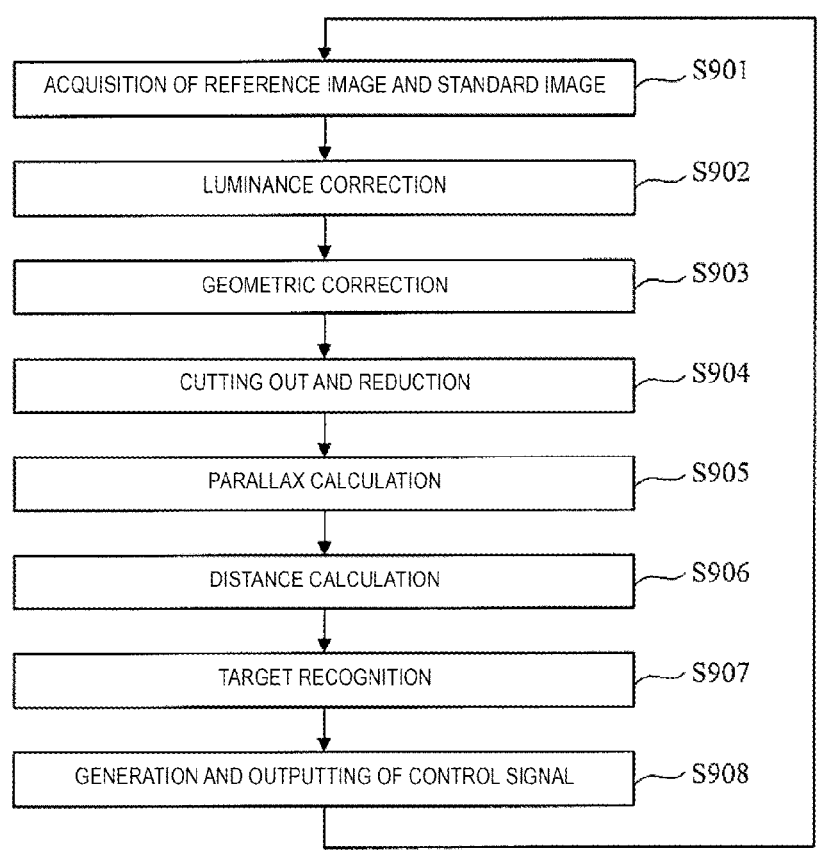
[Fig. 9]

[Fig. 10]
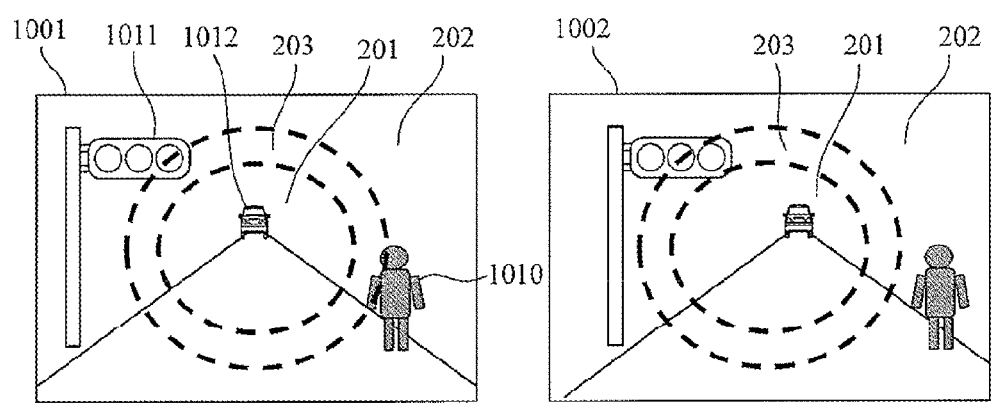

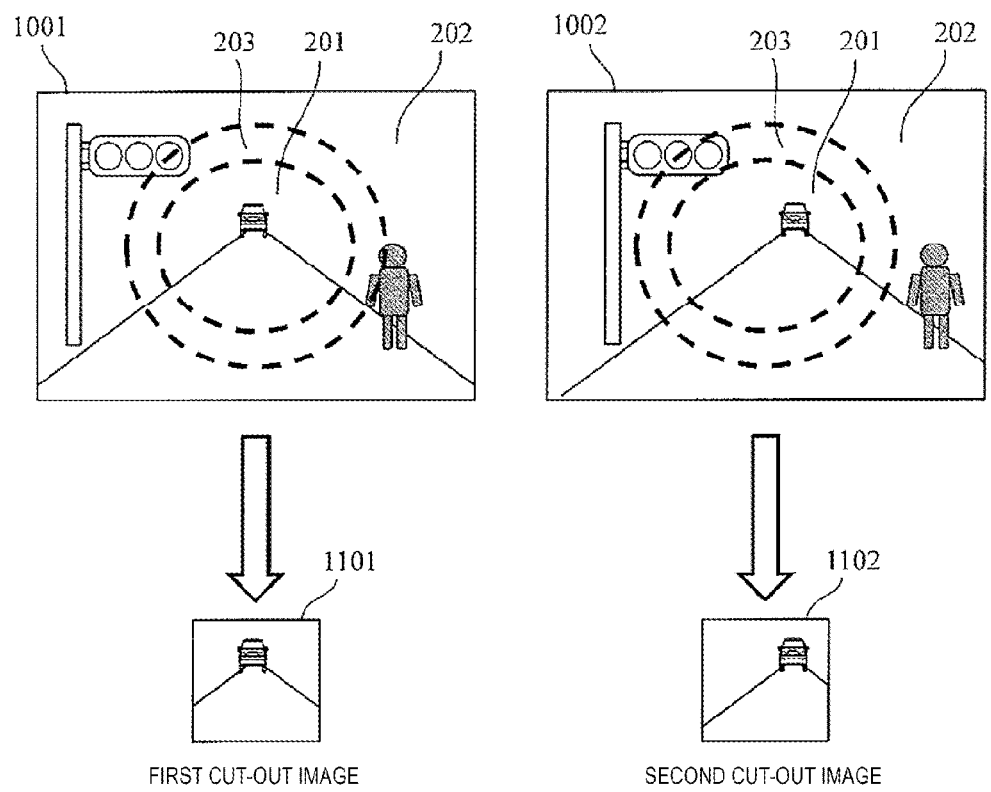
[Fig. 11]

[Fig. 12]
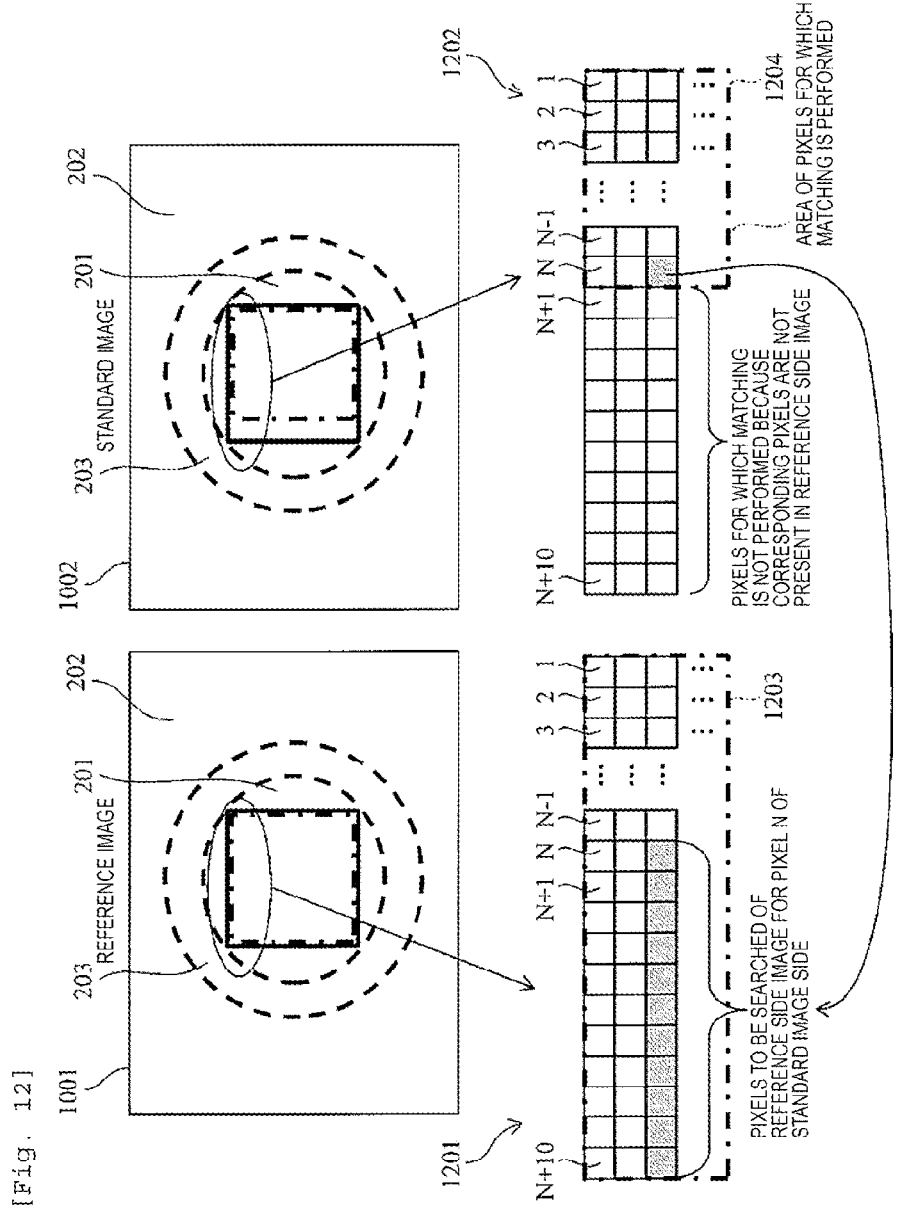

[Fig. 13]
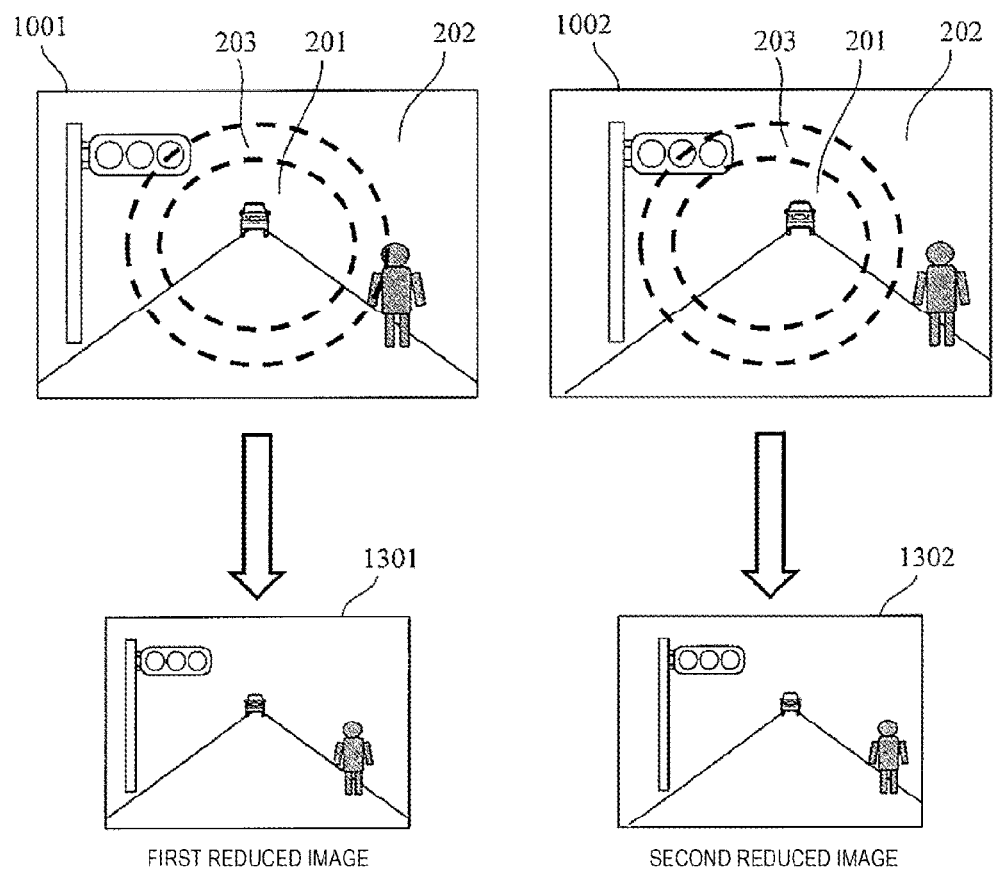
FIRST REDUCED IMAGE                SECOND REDUCED IMAGE

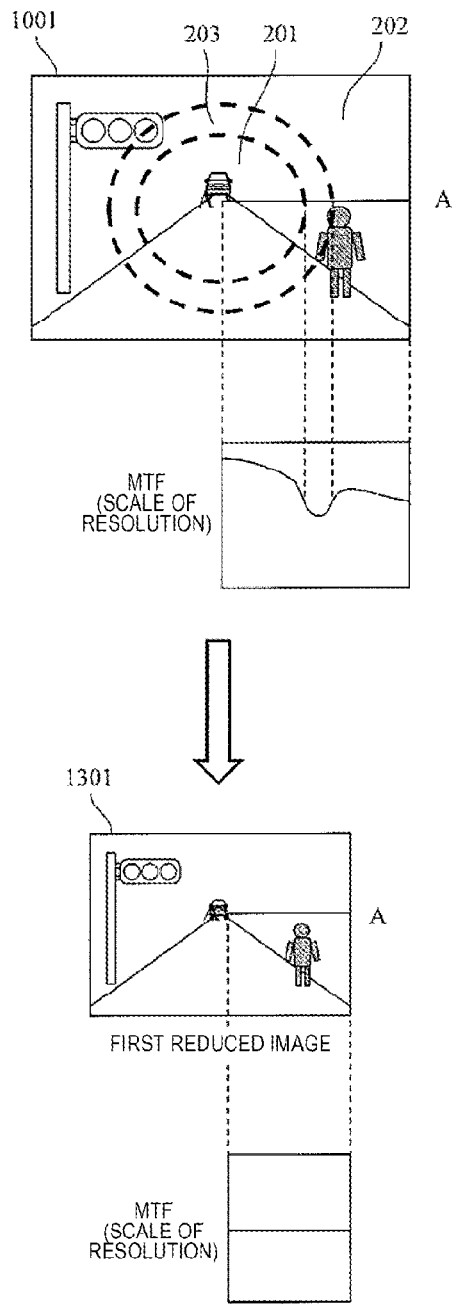

[Fig. 15]
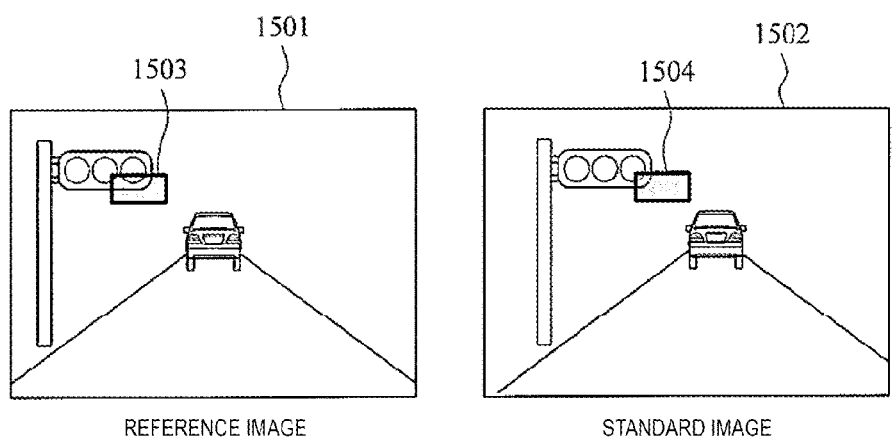
REFERENCE IMAGE STANDARD IMAGE

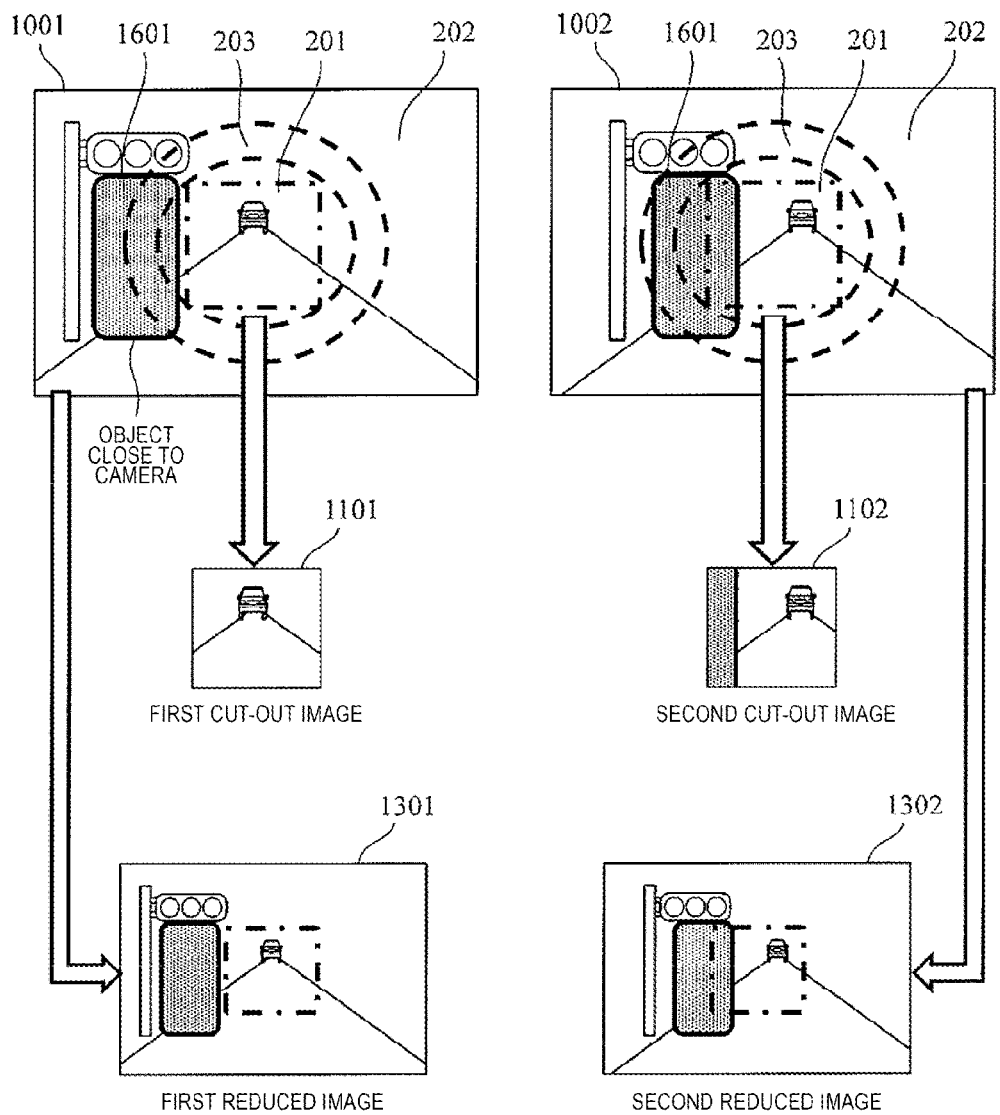

IMAGE PROCESSING DEVICE

TECHNICAL FIELD

The present invention relates to an image processing device.

BACKGROUND ART

Conventionally, a camera provided with a wide-angle lens is known. For example, in PTL 1, an image-capturing device provided with the wide-angle lens (so-called fish-eye lens) is disclosed.

CITATION LIST

Patent Literature

PTL 1: JP-A-2004-354572

SUMMARY OF INVENTION

Technical Problem

Conventionally, an attempt to capture images of both a distant area and a near area by the image-capturing device using the wide-angle lens is made. However, in a case where images of both the distant area and the near area are captured by using the conventional wide-angle lens, the portion where image quality is deteriorated may be generated in an image due to a change rate of an incidence angle per image height. There is concern that the portion where image quality is deteriorated gives a bad influence on image processing to be executed after the image is captured.

The present invention provides an image process ing technique that reduces the influence of the portion in which image quality is deteriorated and which is included in the image captured by the image-capturing device on the image.

Solution to Problem

For example, a configuration described in the claims is adopted in order to solve the problems described above. The present application includes a plurality of means for solving the problems described above, and according to one example of the plurality of means, there is provided an image processing device that processes an image captured by at least one image-capturing device including a lens which has characteristics of having an inflection point of a change rate of an incidence angle per image height with respect to the incidence angle in a predetermined inflection point incidence angle and includes a resolution adjustment unit that adjusts resolution of an inflection point correspondence image area corresponding to the predetermined inflection point incidence angle and resolution of at least one of an inside image area positioned inside the inflection point correspondence image area and an outside image area positioned outside the inflection point correspondence image area.

According to another example of the plurality of means, there is provided an image processing device that processes two images captured by two image-capturing devices including a lens which has characteristics of including an inflection point of a change rate of an incidence angle per image height with respect to the incidence angle at a predetermined inflection point incidence angle and includes a parallax calculation unit that calculates parallax information between inside image areas positioned inside the inflection point correspondence image area corresponding to the predetermined inflection point incidence angle in the two images.

According to still another example of the plurality of means, there is provided an image processing device that processes an image captured by at least one image-capturing device including a lens which has characteristics of including an inflection point of a change rate of an incidence angle per image height with respect to the incidence angle at a predetermined inflection point incidence angle and includes an operation unit that executes first image processing on a first area targeting a short distance and executes second image processing on an image area including at least a second area targeting a long distance, and the second image processing is processing which is set based on information of a third area on the image caused by the inflection point.

Advantageous Effects of Invention

According to the present invention, it is possible to reduce the influence of the portion in which image quality is deteriorated and which is included in an image captured by the image-capturing device, on the image. Further characteristics related to the present invention become apparent from the description and figures of the present specification. A problem to be solved, configuration, and effect other than matters described above become apparent from the description of the following embodiments.

BRIEF DESCRIPTION OF DRAWINGS

FIG. 1 is a diagram illustrating a configuration of an embodiment of an image-capturing device of the present invention.

FIG. 2A is a diagram for explaining a relationship between angular resolution and distance measurement.

FIG. 2B is another diagram for explaining a relationship between angular resolution and distance measurement.

FIG. 3 is a diagram schematically illustrating a range of an image to be captured by an on-vehicle stereo camera of an embodiment.

FIG. 4 is a diagram illustrating an example of a relationship between a change rate of an incidence angle per image height and an image height with respect to an incidence angle in an image-capturing lens according to an embodiment.

FIG. 5 is a diagram illustrating a configuration of an image-capturing lens according to an embodiment.

FIG. 6 is a diagram illustrating an image obtained by cutting out a portion of an image captured by a camera using the image-capturing lens according to an embodiment.

FIG. 7 is a diagram schematically representing the entirety of an image captured by the camera using the image-capturing lens according to an embodiment.

FIG. 8 illustrates an example of a cut-out image.

FIG. 9 is a flowchart illustrating an operation procedure of the image-capturing device of an embodiment.

FIG. 10 illustrates an example of a reference image and a standard image captured by the image-capturing device of an embodiment.

FIG. 11 illustrates an example of a first cut-out image and a second cut-out image that are respectively cut out from the reference image and the standard image.

FIG. 12 illustrates a preferred example of the first cut-out image and the second cut-out image.

FIG. 13 illustrates an example of a first reduced image and a second reduced image generated respectively from the reference image and the standard image.

FIG. 14 is a diagram for explaining the action when reduction processing is executed.

FIG. 15 is a diagram for explaining parallax calculation processing.

FIG. 16 is a diagram for explaining an example in which parallax information is generated separately in both the cut-out image and the reduced image.

DESCRIPTION OF EMBODIMENTS

In the following, the embodiments of the present invention will be described with reference to the accompanying drawings. Although the accompanying drawings illustrate specific embodiments based on the principle of the present invention, the drawings are used for the understanding of the present invention and it is by no means a matter of being used to restrictively interpret the present invention.

FIG. 1 is a diagram illustrating a configuration of an embodiment of an image-capturing device of the present invention. An image-capturing device 1 of the present embodiment is, for example, a stereo camera mounted on a vehicle. In the present example, a case where the image-capturing device 1 is applied to an automatic driving application of a vehicle is assumed. The image-capturing device 1 may also be applied to other fields.

The image-capturing device 1 includes first and second image-capturing units 100a and 100b that are a pair of left and right image-capturing units, each of which captures an image of the front of the vehicle, and an operation unit 110. A control unit (not illustrated) is provided outside the image-capturing device 1.

In the image-capturing device 1, images of the front of a vehicle are simultaneously captured by the first and second image-capturing units 100a and 100b, parallax is obtained by the operation unit 110 using a plurality of images, and a distance from the vehicle to a target in front of the vehicle is calculated based on parallax. The control unit performs vehicle control such as brake control using a distance to the target calculated by the operation unit 110 or a recognition result of the target.

The first and second image-capturing units 100a and 100b that are present in left and right are set to be separated from each other by a base line length and thus, in left and right images obtained by simultaneously photographing the front of the vehicle, the position of the same target is photographed in positions deviated in left and right from each other.

That is, even when the pair of left and right images is images obtained by capturing the same target, the positions on the images deviate in left and right.

The first image-capturing unit 100a includes an optical element 101a and an image-capturing element 102a. The optical element 101a is an image-capturing lens having a structure for refracting light and forming an image on the image-capturing element. The image-capturing element 102a receives an image of light refracted by the optical element 101a and generates an image according to intensity of the received light. The image-capturing element 102a is installed at a location that light passed through the optical element 101a passes through and has an electronic shutter function so that light in predetermined time is processed. The first image-capturing unit 100a may also have a physical shutter function. As the image-capturing element 102a, a charge coupled device (CCD) image sensor, a complementary metal oxide (CMOS) image sensor, and the like are included.

Next, an image-capturing lens used in the present embodiment will be described. As described above, the operation unit 110 measures the distance to the target. Here, description will be made on a relationship between the angular resolution and the distance measurement using FIG. 2A and FIG. 2B. An incidence angle represented by a single pixel has a range and when targets are within the incidence angles indicated by straight lines, the image-capturing device 1 can recognize that the targets exist in the same direction. For example, as in FIG. 2A, when the angular resolution is high, an incidence angle captured by a single pixel 21 of the image-capturing element 102a is narrow and thus, it becomes possible to identify each of a plurality of targets 20A and 20B and accuracy of distance measurement is increased. However, as in FIG. 2B, when the angular resolution is low, the incidence angle captured by a single pixel of the image-capturing element 102a is wide and thus, it is unable to identify the plurality of targets 20A and 20B and accurately measure the distances to the targets 20A and 20B. For that reason, it is desirable to increase the angular resolution for the incidence angle for which a distance to the target needs to be accurately measured.

FIG. 3 is a diagram schematically illustrating a range in which an image to be captured by an on-vehicle stereo camera of the present embodiment. First, description will be made on a function of automatically following a vehicle driving ahead in the automatic driving application. In this function, it is intended to recognize a target (vehicle running in front) at a long distance (for example, approximately 100 m) in the front of the vehicle 301. For example, in a case where a vehicle 301 is traveling on an expressway, it is assumed that an inter-vehicle distance is relatively kept long. Accordingly, the inter-vehicle distance is significantly influenced by an error of distance measurement when a vehicle is traveling on the expressway and thus, it is desirable that distance measurement with high accuracy can be made even for a distant position in the vicinity of the head-on direction. For that reason, it is desirable that angular resolution is high in an area having a small incidence angle.

Next, a collision prevention function in the automatic driving application will be described. In the collision prevention function at an intersection or the like, it is intended to detect a person or vehicle jumping in from the lateral direction and thus, it is desirable to capture an image with an incidence angle as wide as possible. A person or a vehicle are likely to collide is located at a relatively short distance. As described above, image capturing of the long distance is required for the front of the vehicle and image capturing of a wide incidence angle is required for the peripheral directions.

In the present embodiment, the image-capturing lens having characteristics, which will be described in FIG. 4, is used in order to secure a desirable angular resolution over the entirety of a photographing range while attaining a wide angle of a photographing view angle. FIG. 4 is a graph illustrating an example of a relationship between a change rate D of an incidence angle per image height and an image height y with respect to an incidence angle θ in the image-capturing lens according to the present embodiment. Here, the image height y is a value obtained by representing an image position on an evaluation surface of an optical system in a distance from an optical axis. A reference numeral 401 is a graph indicating a change rate of an incidence angle, a reference numeral 402 is a graph indicating an image height, a reference numeral 403 is an inflection point in the change rate of the incidence angle, and an incidence angle corresponding to the inflection point is a switching incidence angle θs.

The image-capturing lens according to the present example is characterized in that the switching incidence angle θs of the change rate of the incidence angle per image height exists in a range of 10° to 30°. In a case where the image-capturing lens is used in a device for being mounted on a vehicle, it is desirable that the switching incidence angle θs of the change rate of the incidence angle per image height exists in a range of 10° to 30°. A detection distance for each incidence angle at each use utilized in a driving support device of a driver or automatic driving is made short in an area from 10° to 30°. That is, required accuracy of angular resolution is relatively low. For that reason, even such an angular resolution with less accuracy tends to be allowed in the incidence angle of 10° to 30°. In this area, an angular resolution transition area in which the angular resolution is likely to be varied is provided so that it is possible to provide a distance measurement system capable of capturing a wide angle while measuring a relatively long distance in the center. This distance measuring system has robustness with which failure in processing as an on-vehicle distance measuring system is unlikely to occur, even when an error of distance calculation caused by variations in the angular resolution is present.

From the above-description, the image-capturing lens used in the present embodiment has characteristics of including an inflection point 403 of a change rate D of an incidence angle per image height with respect to the incidence angle at a predetermined inflection point incidence angle (θs), and is different from a conventional image-capturing lens in which the change rate of the incidence angle per image height is monotonously changed. In a case where an image-capturing element such as the CCD image sensor, the CMOS image sensor, or the like is adopted as the image-capturing element, a value which indicates how many pixels are included per unit incidence angle becomes an indicator for an image-capturing lens. In FIG. 4, the portion in which the change rate D of the incidence angle per image height is gentle tends to have small variation of the angular resolution and also high angular resolution. On the other hand, the portion (portion at which the graph rises) including the inflection point 403 of the change rate D of the incidence angle per image height is, as described above, the angular resolution transition area in which the angular resolution is likely to be varied and the angular resolution may be lowered. Accordingly, speaking from the point of view of the image-capturing element 102a, the image-capturing lens used in the present embodiment can be defined as an image-capturing lens having characteristics that a portion in which a change rate of angular resolution is high compared to the central portion and the peripheral portion exists between the central portion and the peripheral portion.

In the image-capturing lens according to the present embodiment, a magnification of a small incidence angle part in which an incidence angle is smaller than the inflection point incidence angle (θs) is set to be larger than a magnification of a large incidence angle part in which an incidence angle is larger than the inflection point incidence angle (θs). Accordingly, in a case where the image-capturing lens is used in a device (distance measurement system or the like) in use for being mounted on a vehicle, a detection distance for each incidence angle at each use used in a driving support device of a driver or automatic driving is made long in the center and is made short in the peripheral directions.

According to the image-capturing lens having characteristics described above, although the measurement distance is long in the central area having a small incidence angle and the measurement distance is short in the peripheral portion having a large incidence angle, a wide range can be captured.

A lens configuration of the image-capturing lens having the optical characteristics as described above will be described using FIG. 5. The lens is configured with two aspherical lenses 520 and 530 and a spherical lens group 540. Light beams incident onto a first incidence surface 510 of the lens are guided so that a desired relationship between the image height and the incidence angle is obtained by the two aspherical lenses 520 and 530 at a light beam incidence side and images are formed on the image-capturing element 102a by the spherical lens group 540 of a rear group. The configuration of FIG. 5 is an example and is not construed in a limiting sense. For example, an IR filter for absorbing infrared ray may be added to an emission surface of the lens in the configuration of FIG. 5. In the example of FIG. 5, although two aspherical lenses indicated by the reference numeral 520 and the reference numeral 530 are used, as another example, the lenses indicated by the reference numeral 520 and the reference numeral 530 may be formed to be both-side aspherical. The most part of characteristics of the image-capturing lens of the present embodiment is characterized by two aspherical lenses of which incidence surfaces are aspherical. Accordingly, a conventional image-capturing lens configuration may be used in the rear lens group after the lenses indicated by the reference numerals 520 and 530.

On the other hand, in the camera using the image-capturing lens provided with the optical characteristics described above, an image quality is deteriorated in the portion of the inflection point of the change rate of an incidence angle per image height. FIG. 6 is a diagram illustrating an image obtained by cutting out a portion of an image captured by a camera using the image-capturing lens having the optical characteristics described above.

The image of FIG. 6 is not an actual image acquired by the camera described above, but an image in which contrast is adjusted in order to make it easy to understand a blurred area. Here, the blurred area is an area in which the resolution within the image is low. Resolution is a term indicating how finely details are discriminated. Indicators representing resolution includes a response function (modulation transfer function (MTF) or amplitude transfer function), and the like. Other indicators representing resolution include a point spread function (PSF) and a line spread function (LSF). In the present example, the MTF is used as the indicator representing resolution. The MTF indicates a resolution characteristics indicator of quantitative scale that represents spatial resolution and is a function of representing a response to each spatial frequency.

Description will be made on a relationship between the blurred area described above and the image-capturing lens according to the present embodiment, using FIG. 3. As illustrated in FIG. 3, it is intended to recognize a target (vehicle running in front) at a long distance (for example, approximately 100 m) in a front direction of the vehicle 301. Accordingly, resolution of the central area (area for which an incidence angle to the optical axis is small) of the image-capturing lens is set to be high. It is intended to recognize a target at a short distance (for example, approximately 20 m) from the vehicle 301 in the peripheral area of the image-capturing lens (area in which an incidence angle to the optical axis is large) and thus, resolution of the peripheral area of the image-capturing lens is set to be high. On the other hand, the portion indicated by 302 of FIG. 3 is an area having less need for recognition during driving of a vehicle and thus, there is less need for acquiring the portion as image information in the automatic driving application. Accordingly, the inflection point 403 of the change rate D of an incidence angle per image height is set in the portion. As described above, as an example, the inflection point 403 exists in a range of incidence angles 10° to 30°. According to this configuration, the portion (portion including the inflection point 403) at which the change rate D of the incidence angle per image height D is abruptly changed exists between the central area and the peripheral area of the image-capturing lens. An area corresponding to the inflection point 403 corresponds to the blurred area in the image of FIG. 6. Respective areas depicted in a fan shape in FIG. 3 are areas in which recognition as well as detection of an object can be made by the image processing device and an area (for example, a portion indicated by 302) located outside the recognizable area having the fan shape is an area in which detection of the object is possible but recognition of the object becomes difficult because a captured image becomes small.

FIG. 7 is a diagram schematically representing an image captured using the image-capturing lens with the optical characteristics described above. The image includes a first area (inside image area) 201, a second area (outside image area) 202, and a third area (inflection point correspondence image area) 203. The first area 201 is an area (in the following, referred to as "small incidence angle area") in which the incidence angle to the optical axis of the image-capturing lens is small and corresponds to the central area of the image-capturing lens. The first area 201 is an area which targets the long distance (first distance range). The second area 202 is an area (in the following, referred to as "large incidence angle area") in which the incidence angle to the optical axis of the image-capturing lens is large and corresponds to the peripheral area of the image-capturing lens. The second area 202 is an area which targets the short distance (second distance range nearer than first distance range). The third area 203 is positioned between the first area 201 and the second area 202. The third area 203 is a ring-shaped area or a doughnut-shaped area and corresponds to the portion (including the inflection point 403) at which the change rate D of the incidence angle per image height is abruptly changed. The third area 203 is an area in which resolution is lower than the first area 201 and the second area 202.

With regard to the image of FIG. 7, change in resolution (MTF) along the line A-A is illustrated. The resolution is decreased in the doughnut-shaped third area 203 and thereafter, the resolution is increased in the second area 202. Accordingly, when the image-capturing lens according to the present embodiment is defined by an image captured by the image-capturing lens, the image-capturing lens may be expressed as a lens having characteristics that an intermediate incidence angle area, in which the resolution is lowered than the small incidence angle area and the large incidence angle area, exists between the small incidence angle area in which the incidence angle to the optical axis is small and the large incidence angle area in which the incidence angle to the optical axis is large. In other words, the image-capturing lens of the present example may be regarded as a lens designed in such a way that the third area 203 between the first area 201 and the second area 202 includes the inflection point of resolution.

In the following, description will be made on an embodiment that solves a new problem occurring in the image captured using the image-capturing lens having the optical characteristics described above. Specifically, the present embodiment provides a technique that reduces the influence of the third area 203 in which resolution is low and makes it possible to satisfactorily recognize external environment using an image corresponding to a near area and an image corresponding to a distant area.

Similar to the first image-capturing unit 100a, the second image-capturing unit 100b includes an optical element 101b and an image-capturing element 102b. The second image-capturing unit 100b has the same configuration as that of the first image-capturing unit 100a and thus, description thereof will be omitted. The design of the image-capturing lens of the optical element 101b is the same as that of the optical element 101a.

The operation unit 110 is an information processing device configured with a processor (central processing unit (CPU)), a memory, and the like. The processor executes processing of respective constitutional elements of the operation unit 110, which will be described in the following, according to instructions of a program stored in the memory. That is, respective constitutional elements of the operation unit 110 can be implemented as software. A portion of the operation unit 110 can also be installed as hardware.

The operation unit 110 includes, as constitutional elements, a synchronization signal transmitting unit 117, a reference image acquisition unit 118a, a standard image acquisition unit 118b, a luminance correction unit 120, a geometric correction unit 121, an image cutting-out unit 122, an image reduction unit 123, a parallax calculation unit 124, a distance calculation unit 125, and a recognition unit 126. Portions related to image processing in the operation unit 110 may be collectively referred to as an image processing unit.

The operation unit 110 includes the following storing units configured with a memory or a hard disk. Specifically, the operation unit 110 includes a reference image storing unit 131, a standard image storing unit 132, a processed image storing unit 133, a luminance correction information storing unit 134, a geometric correction information storing unit 135, a processing area information storing unit 136, and a reduction information storing unit 137.

The reference image storing unit 131 stores a reference image (first image) captured by the first image-capturing unit 100a. The standard image storing unit 132 stores a standard image (second image) captured by the second image-capturing unit 100b.

The processed image storing unit 133 stores images that are respectively processed and generated by the constitutional elements of the operation unit 110.

The luminance correction information storing unit 134 stores a correction coefficient of luminance of each pixel in the images (reference image and standard image) of the first image-capturing unit 100a and the second image-capturing unit 100b The correction coefficient is a value at which uniform lighting is made or luminance of a standard image and a comparative image at the time of capturing a target is made substantially the same in the entire surface of the image.

The geometric correction information storing unit 135 stores a correction amount of geometry of each pixel in the images (reference image and standard image) of the first image-capturing unit 100a and the second image-capturing unit 100b The correction amount is a value for correcting the captured image to an image when distortion of the optical element 101a and optical element 101b, an error of a focal distance of the first image-capturing unit 100a and the second image-capturing unit 100b, an error of an optical axis position on the image, and a mounting error is zero.

The processing area information storing unit 136 stores information of a processing area for the reference image and the standard image. Here, the processing area means an area which is cut out by the image cutting-out unit 122. A position of the portion at which (a portion including the inflection point 403) the change rate D of the incidence angle per image height is abruptly changed can be known at the time of designing the lens and thus, it is possible to know which area on the image becomes the third area 203 in advance. The cut-out area may be set in advance according to the design of the lens.

FIG. 8 illustrates an example of a processing area (cut-out area). The cut-out area is, for example, an area 801 of a quadrangle inscribed on the third area 203. The cut-out area is preferably an area of a quadrangle whose respective vertices are positioned inside from the third area 203 by several pixels. A portion of vertices of the quadrangle is set in a position separated from the third area 203 whose resolution is low to thereby make it possible to prevent mismatching on the parallax calculation using pixels near the vertices of the quadrangle area 801.

The cut-out area may be an area (for example, a circular area) defined by a substantial curve along the third area 203. Also, in this case, the cut-out area is preferably an area in which the curve is positioned inside from the third area 203 by several pixels. Information of the cut-out area may also be obtained by a method other than the method of designating a specific area. For example, a resolution threshold may be stored as information of the cut-out area. According to this configuration, an area which is positioned inside the third area 203 and has resolution greater than or equal to the threshold is cut out.

The reduction information storing unit 137 stores information of a reduction rate for the reference image and the standard image. It is possible to know what degree of resolution the third area 203 will have in advance at the time of designing the lens and thus, the reduction rate is set here in advance based on information of resolution of the third area 203. For example, the reduction rate may be set according to a level of resolution of the third area 203, a size of a width of the third area 203, or the like. The reduction rate may be set to a degree to which the influence on the parallax calculation by the third area 203 becomes small.

The synchronization signal transmitting unit 117 generates a synchronization signal and transmits the synchronization signal to a reference image acquisition unit 118a and a standard image acquisition unit 118b. The reference image acquisition unit 118a acquires the image generated by the image-capturing element 102a of the first image-capturing unit 100a, conforming to the synchronization signal of the synchronization signal transmitting unit 117. The standard image acquisition unit 118b acquires the image generated by the image-capturing element 102b of the second image-capturing unit 100b, conforming to the synchronization signal of the synchronization signal transmitting unit 117. Accordingly, the image captured simultaneously by the first and second image-capturing units 100a and 100b are fetched in the reference image acquisition unit 118a and the standard image acquisition unit 118b.

The luminance correction unit 120 reads the correction coefficient of luminance of each pixel from the luminance correction information storing unit 134 and corrects luminance of the processing area, which is set in advance, of the reference image and the standard image.

The geometric correction unit 121 reads a two-dimensional correction amount of geometry of each pixel from the geometric correction information storing unit 135, performs geometric correction in the processing area of the reference image and the standard image, and corrects a shape of the image. Here, the processing area is an area which is set in advance.

The image cutting-out unit 122 reads information of a cut-out area from the processing area information storing unit 136 and cuts out pixels corresponding to information of the cut-out area from each of the reference image and the standard image. The image cutting-out unit 122 stores the image (first cut-out image) cut out from the reference image and image (second cut-out image) cut out from the standard image in the processed image storing unit 133. For example, when stereo matching is performed between the image areas having different resolution, it may be difficult to associate pixels reflecting the same part of an object on the image-capturing element. As such, the image areas (cut-out image areas) having the same resolution level are subjected to matching so as to make it possible to suppress erroneous matching or failure of matching.

The image reduction unit 123 executes reduction processing which is set based on information (resolution) of the third area 203 caused by a portion (a portion including the inflection point 403) at which the change rate D of the incidence angle per image height is abruptly changed. Here, reduction processing is implemented by thinning out data or averaging data of adjacent pixels. The image reduction unit 123 reads information of a reduction rate from the reduction information storing unit 137 and generates a reduced image (first reduced image) of the reference image and a reduced image (second reduced image) of the standard image. The image reduction unit 123 stores the first reduced image and the second reduced image in the processed image storing unit 133.

As described above, resolution of the third area 203 corresponding to the inflection point incidence angle ($\theta$s), resolution of the first area 201 positioned inside the third area 203, and resolution of the second area 202 positioned outside the third area 203 are adjusted by reduction processing. Accordingly, the image reduction unit 123 corresponds to a resolution adjustment unit that adjusts resolution of the third area 203 corresponding to the inflection point incidence angle ($\theta$s), resolution of the first area 201 positioned inside the third area 203, and resolution of the second area 202 positioned outside the third area 203. Resolution of the third area 203 (inflection point correspondence image area) is different from that of the peripheral image areas (first area 201 and second area 202) and thus, resolution of these areas is adjusted to thereby make it to suppress occurrence of influence on processing of detection or recognition of an object by lens characteristics. Here, processing for reducing the entirety of an image is described as resolution adjustment processing, but this example is not construed in a limiting sense. For example, from the viewpoint of reduction of bad influence on image processing, adjustment is made so that at least the difference in resolution between the third area 203 corresponding to the inflection point incidence angle ($\theta$s) and the peripheral image areas (at least one of first area 201 and second area 202) is eliminated or becomes small. Accordingly, the resolution adjustment unit may execute processing for adjusting resolution of the third area 203 corresponding to the inflection point incidence angle ($\theta$s) and resolution of at least one of the first area 201 positioned inside the third area 203 and the second area 202 positioned outside the third area 203.

The parallax calculation unit 124 searches an area on the reference image which corresponds to an area having a predetermined size (template image) extracted from the standard image. The parallax calculation unit 124 calculates a difference between a position of an area on the reference image that coincides with the template image and a position of the template image on the standard image, that is, parallax. The parallax calculation unit 124 calculates parallax for each pixel to calculate parallax information. In a case where parallax for a certain image area is obtained, it is possible to detect that some object exists in the image area.

In the present embodiment, the parallax calculation unit 124 calculates two pieces of parallax information. First parallax information is a piece of information calculated by using the first cut-out image as the reference image and using the second cut-out image as the standard image. Second parallax information is a piece of information calculated by using the first reduced image as the reference image and using the second reduced image as the standard image. In the present example, the image captured by the first image-capturing unit 100*a* is used as the reference image and the image captured by the second image-capturing unit 100*b* is used as the standard image, but this example is not construed here in a limiting sense. The image captured by the first image-capturing unit 100*a* may be used as the standard image and the image captured by the second image-capturing unit 100*b* may be used as the reference image The distance calculation unit 125 calculates a distance from the image-capturing device 1 to a target on the image in the optical axis direction of the first image-capturing unit 100*a* and the second image-capturing unit 100*b* based on parallax calculated by the parallax calculation unit 124, a distance (base line length) between focal points, a focal distance and a pixel pitch (distance between pixels of image-capturing elements 102*a* and 102*b*) of the first image-capturing unit 100*a* and the second image-capturing unit 100*b*. The distance calculation unit 125 calculates the distance for each pixel to calculate a distance image.

The recognition unit 126 recognizes a target using an image. The image which becomes material for recognition processing may be the reference image, the standard image, or a parallax image obtained by associating each part (characteristic point) for which parallax information is obtained with parallax information (information of parallax value or distance) of the each part. Recognition corresponds to processing for identifying specific kind of the object (that is, detected object) for which parallax information is obtained. The kind of the object includes, for example, a vehicle, a pedestrian, a signal-light, a sign, and a division line such as a white line. The recognition unit 126 sends information of a recognition result of a target and the image-capturing device 1 to a control unit (not illustrated). The control unit generates a control signal based on information of the recognition result and performs vehicle control such as brake control.

An operation procedure of an embodiment of the image-capturing device 1 of the present embodiment will be described using a flowchart of FIG. 9. In the following description, although description will be made by using the functional block of FIG. 1 as a subject, since processing determined in a program is executed by a processor while using the memory or the like in the following processing, description may be made by using the processor as a subject.

In Step S901, fetch processing of the reference image and the standard image is performed. First, a synchronization signal is generated by the synchronization signal transmitting unit 117 and sent to the reference image acquisition unit 118*a* and the standard image acquisition unit 118*b*.

The reference image acquisition unit 118*a* receives the synchronization signal from the synchronization signal transmitting unit 117 and receives an image from the image-capturing element 102*a*. The image-capturing element 102*a* receives an image of light refracted by the optical element 101*a*, generates an image according to intensity of received light, and sends the image to the reference image acquisition unit 118*a*. The reference image acquisition unit 118*a* stores the image received from the image-capturing element 102*a*, as the reference image, in the reference image storing unit 131.

The standard image acquisition unit 118*b* receives the synchronization signal from the synchronization signal transmitting unit 117 and receives the image from the image-capturing element 102*b*. The image-capturing element 102*b* receives an image of light refracted by the optical element 101*b*, generates an image according to intensity of received light, and sends the image to the standard image acquisition unit 118*b*. The standard image acquisition unit 118*b* stores the image received from the image-capturing element 102*b*, as the standard image, in the standard image storing unit 132.

FIG. 10 is an example of the reference image and the standard image. The first and second image-capturing units 100*a* and 100*b* are set to be separated from each other in left and right direction by a base line length and thus, even when the reference image 1001 and the standard image 1002 are a pair of left and right images obtained by capturing the same target, positions on the images deviate from each other in left and right.

In Step S902, a luminance correction of the reference image 1001 and the standard image 1002 is performed. The luminance correction unit 120 reads respective correction coefficients of respective pixels in the images of the image-capturing element 102*a* and the image-capturing element 102*b* from the luminance correction information storing unit 134, and reads the reference image and the standard image respectively from the reference image storing unit 131 and the standard image storing unit 132. A preset luminance value of each pixel of the processing area of the reference image 1001 is multiplied by a correction coefficient of each pixel and corrects the luminance value of the processing area of the reference image 1001. Similarly, a preset luminance value of each pixel of the processing area of the standard image 1002 is multiplied by a correction coefficient of each pixel and corrects the luminance value of the processing area of the standard image 1002. The luminance correction unit 120 stores the corrected reference image 1001 and standard image 1002 in the reference image storing unit 131 and the standard image storing unit 132, respectively.

In Step S903, the geometric correction of the reference image 1001 and the standard image 1002 is performed. The geometric correction unit 121 reads a two-dimensional correction amount of geometry of each pixel in the images (reference image 1001 and standard image 1002) of the image-capturing element 102*a* and the image-capturing element 102*b* from the geometric correction information storing unit 135, and reads the reference image 1001 and the standard image 1002 from the reference image storing unit 131 and the standard image storing unit 132, respectively. The position on the reference image 1001 obtained by changing the two-dimensional correction amount of geometry of each pixel of the processing area of the reference image 1001 is calculated to calculate a luminance value of the position from a luminance value of the pixel located at the periphery of the position by interpolation calculation. The calculation is conducted on pixels of the entire processing area on the reference image 1001. Similarly, the position on the standard image 1002 obtained by changing the two-dimensional correction amount of each pixel of the processing area of the standard image 1002 is calculated to calculate a luminance value of the position from a luminance value of the pixel located at the periphery of the position by interpolation calculation. The calculation is conducted on pixels of the entire processing area on the standard image 1002. The geometric correction unit 121 stores the corrected reference image 1001 and standard image 1002 in the reference image storing unit 131 and the standard image storing unit 132, respectively.

In Step S904, image cutting-out processing and image reduction processing are performed on the reference image 1001 and the standard image 1002. The image cutting-out unit 122 reads information of a cut-out area from the processing area information storing unit 136. The image cutting-out unit 122 reads the reference image 1001 and the standard image 1002 from the reference image storing unit 131 and the standard image storing unit 132, respectively. The image cutting-out unit 122 generates a first cut-out image from the reference image 1001 and generates a second cut-out image from the standard image 1002, based on information of the cut-out area. FIG. 11 is an example of the first cut-out image 1101 and the second cut-out image 1102 that are generated respectively from the reference image 1001 and the standard image 1002. The image cutting-out unit 122 stores the first cut-out image 1101 and the second cut-out image 1102 in the processed image storing unit 133.

FIG. 12 is a diagram for explaining a preferred example of the first cut-out image and the second cut-out image. A reference numeral 1201 indicates an enlarged view of pixels of an area (area surrounded by a circle) inside of the third area 203 in the reference image 1001. A reference numeral 1202 indicates an enlarged view of pixels of an area (area surrounded by a circle) inside of the third area 203 in the standard image 1002. As illustrated in FIG. 12, the first cut-out area 1203 which is cut out from the reference image 1001 is large compared to the second cut-out area 1204 which is cut out from the standard image 1002. When stereo matching is performed, a reference pixel of the reference image having a given width α is searched for a standard pixel of the standard image side. α is referred to as a search width and is, for example, approximately 10 pixels. The search width is an example and is not limited to the search width. In the example of FIG. 12, pixels of the Nth column of the standard image 1202 are searched for the widths of the Nth to N+10th columns of the reference image 1201.

An area used for stereo matching in the reference image is wide compared to an area used for stereo matching in the standard image by a search width. As described above, the first and second image-capturing units 100a and 100b, that are present in left and right, are set to be separated from each other in left and right direction by a base line length and thus, even when the pair of left and right images are images obtained by capturing the same target, positions on the images deviate from each other in left and right. For example, the pixels of N+1th to N+10th columns of the standard image 1202 of FIG. 12 do not have any corresponding pixels in the reference image 1201 side. Especially, the pixels of N+1th to N+10th columns of the standard image 1202 are pixels included in the third area 203 of the reference image 1201 side and thus, it is preferable that these pixels are not used. Accordingly, the second cut-out area 1204 which is cut out from the standard image 1002 is smaller than the first cut-out area 1203 which is cut out from the reference image 1001.

The first cut-out area 1203 which is cut out from the reference image 1001 is preferably set so that the pixel of an edge thereof is not included in the third area 203. With this, when the first cut-out area 1203 of the reference image 1201 is searched by using the second cut-out area 1204 of the standard image 1202, it is possible to prevent an erroneous matching in the third area 203 of the reference image 1201 side. Since it is possible to know a deviation amount of a pair of left and right images, a pixel width of the third area 203, or the e at the time of designing a lens, it is sufficient if information of the first cut-out area 1203 and the second cut-out area 1204 is stored in the processing area information storing unit 136 in advance.

Next, the image reduction unit 123 reads information of a reduction rate from the reduction information storing unit 137. The image reduction unit 123 generates a reduced image (first reduced image) of the reference image 1001 and a reduced image (second reduced image) of the standard image 1002 based on information of the reduction rate. FIG. 13 is an example of a first reduced image 1301 and a second reduced image 1302 generated respectively from the reference image 1001 and the standard image 1002. By this reduction processing, the portion corresponding to the third area (area in which resolution is low) is eliminated or becomes small in the reduced images 1301 and 1302 and influence on parallax calculation, which will be described hereinafter, can be made small. The image reduction unit 123 stores the first reduced image 1301 and the second reduced image 1302 in the processed image storing unit 133. As a method of reduction processing, other known methods may be used without being limited to data thinning-out and pixel averaging method described above.

FIG. 14 is a diagram for explaining the action when reduction processing is executed. In FIG. 14, although description will be made on the reference image 1001, the same also applies to the standard image 1002. When change in resolution (MTF) along the line A-A is illustrated for the first reduced image 1301 of the reference image 1001, the resolution (MTF) takes a linear shape and the resolution (MTF) becomes substantially a constant value. In the reference image 1001 before reduction processing is performed, resolution (MTF) is significantly reduced in the third area 203. In contrast, in the first reduced image 1301, resolution takes a linear shape in positions of values of resolution (MTF) in the third area 203 of the reference image 1001. Although resolution of the image is reduced in its entirety by reduction processing, it becomes an image of the third area 203 in which a blurred area is not present and variation in the value of resolution is not present. With this, it is possible to prevent erroneous matching.

Here, although image cutting-out processing and image reduction processing are sequentially executed, the image cutting-out processing and the image reduction processing may be executed in parallel. For example, explanation is made on the reference image 1001. In this case, the parallel execution may be done such that pixels of the reference image are read column-by-column basis while executing reduction processing, and when a pixel corresponding to the cut-out area is reached, the pixel is cut out. In a case where image cutting-out processing and image reduction processing are executed in parallel, an effect by which a use amount of memory can be reduced is achieved.

In Step 3905, parallax calculation processing is performed. As a parallax calculation method, for example, block matching is included. The parallax calculation unit 124 searches an area on the reference image corresponding to the area (template image) which has a predetermined size and extracted on the standard image. The parallax calculation unit 124 calculates a difference between a position of an area on the reference image that coincides with the template image and a position of the template image on the standard image, that is, parallax.

FIG. 15 is a diagram for explaining parallax calculation processing. As illustrated in FIG. 15, an image 1504 (template image) of an area having a predetermined size on a standard image 1502 is extracted. An image of an area in which the same target as the template image 1504 is photographed is searched on a reference image 1501 by the following template matching.

For example, in template matching, an image 1503 of an area having a predetermined size on the reference image 1501 is extracted and a sum of absolute difference (SAD) between a luminance value of the template image 1504 on the standard image 1502 and a luminance value of the image 1503 of the area having a predetermined size of the reference image 1501 is calculated. The sum of absolute difference between the luminance values is calculated for an image of each area on the reference image 1501.

A distance between an image of an area with the smallest value, on the reference image 1501 and the area of the template image 1504, that is, parallax is calculated. This processing is conducted on the entire area on the standard image 1502 and parallax of the standard image 1502 is calculated in its entirety. Parallax information calculated as described above is stored in the processed image storing unit 133.

In the present embodiment, the parallax calculation unit 124 calculates two pieces of parallax information. Specifically, the parallax calculation unit 124 separately generates parallax information from both the cut-out image and the reduced image. The parallax calculation unit 124 calculates first parallax information by processing as described above by using the first cut-out image 1101 as the reference image and setting the second cut-out image 1102 as the standard image. Furthermore, the parallax calculation unit 124 calculates second parallax information by processing as described above by using the first reduced image 1301 as the reference image and using the second reduced image 1302 as the standard image. The parallax calculation unit 124 stores the first parallax information and second parallax information in the processed image storing unit 133.

The present embodiment has an advantage capable of calculating parallax for each of the cut-out image and the reduced image. Conventionally, for example, in a case where a target such as a person 1010 or a traffic signal 1011 exists so as to be included in the third area 203 of FIG. 10, resolution of a portion of the target is decreased and thus, when template matching described above is performed, there is a concern that matching (mismatching) is made at a different position of the target for the template image. In the present embodiment, parallax calculation is performed between the first reduced image 1301 and the second reduced image 1302 in which the portion of the third area 203 is small and thus, it is possible to prevent mismatching in template matching. The person 1010, a traffic signal 1011, or the like, of FIG. 10 is a target which is at a short distance and is displayed largely on the image and thus, although the target is reduced to some extent, parallax calculation processing is not influenced. On the other hand, in a case where reduction processing is performed when a target such as a vehicle 1012 of FIG. 10 is at a long distance the target becomes too small, and template matching is likely to cause mismatching. However, in the present embodiment, the portion in which the target which is at the long distance on the image is subjected to cutting-out processing and parallax calculation is performed between the first cut-out image 1101 and the second cut-out image 1102 and thus, it is possible to prevent mismatching in template matching.

FIG. 16 is a diagram for explaining an example in which parallax information is generated separately in both the cut-out image and the reduced image. In FIG. 16, a case in which an object 1601 exists close to a stereo camera assumed. As the object 1601, a person, a vehicle, a sign, and like may be included. On the captured image, the object 1601 has a size extending from the first area 201 to the second area 202 over the third area 203. In this case, there may be a case where the object 1601 exists within the second cut-out image 1102 which is the standard image but the object 1601 does not exist within the first cut-out image 1101 which is the reference image. In this case, when template matching is performed between the first cut-out image 1101 and the second cut-out image 1102, mismatching may occur. If it is supposed that template matching were performed between areas (second area 202 and third area 203) after eliminating the first area 201, a portion of the object 1601 is cut out in the standard image side and proper matching processing is not performed. Accordingly, in the present embodiment, the parallax calculation unit 124 separately executes parallax calculation processing using the first cut-out image 1101 and the second cut-out image 1102 and parallax calculation processing using the first reduced image 1301 and the second reduced image 1302. In a case where the object 1601 described above exists, proper parallax information can be obtained by template matching between the first reduced image 1301 and the second reduced image 1302.

In consideration of the example described above, in the present embodiment, in a case where a certain object is (completely) included in the first area 201 of both the standard image and the reference image, parallax information obtained by parallax calculation processing using the first cut-out image 1101 and the second cut-out image 1102 becomes useful in subsequent processing (distance calculation and target recognition). On the other hand, in a case where at least a portion of a certain object is included in areas (second area 202 and third area 203) except for the first area 201 in at least one of the standard image and the reference image, parallax information obtained by parallax calculation processing using the first reduced image 1301 and the second reduced image 1302 becomes useful in subsequent processing (distance calculation and target recognition). As such, both first parallax calculation processing between the cut-out areas and second parallax calculation processing between the reduced images are performed to thereby make it possible to recognize the object even when the object exists in any area within the image.

A case where the object is present in an area except for the first area 201 is assumed. In this case, it is sufficient to have the standard image and the reference image in which resolution of at least the second area 202 is adjusted according to resolution of the third area 203. The parallax calculation unit 124 calculates parallax information of the third area 203 and the second area 202 using the standard image and the reference image in which resolution of at least the second area 202 is adjusted. With this, it is possible to detect and recognize the object which is present in the areas (third area 203 and second area 202) other than the first area 201.

In Step S906, distance calculation processing is performed. The distance calculation unit 125 reads first parallax information and second parallax information from the processed image storing unit 133. The distance calculation unit 125 calculates a distance from the image-capturing device 1 to a target on the image in the optical axis direction of the first image-capturing unit 100a and the second image-capturing unit 100b, based on first parallax information and second parallax information, a distance (base line length) between focal points of the first image-capturing unit 100a and the second image-capturing unit 100b, a focal distance, and a pixel pitch (distance between pixels of image-capturing elements 102a and 102b). The distance calculation unit 125 stores a calculated distance image in the processed image storing unit 133.

As a distance calculation method, a known method may be used. As an example, the following expression can be used.

Distance $L = f \times B / (d \times c)$

Here, f is a focal distance of the first image-capturing unit 100a and the second image-capturing unit 100b, B is a distance (base line length) between focal points of the first image-capturing unit 100a and the second image-capturing unit 100b, d is parallax, and c is a pixel pitch between the image-capturing element 102a and the image-capturing element 102b.

In Step S907, target recognition processing is performed. The recognition unit 126 reads a distance image from the processed image storing unit 133. The recognition unit 126 recognizes a target photographed in an image which becomes a standard (for example, standard image) and a position of the target, using the distance image. As target recognition processing, a known method can be used. The recognition unit 126 outputs information of a recognition result to a control unit outside of the image-capturing device 1.

In Step S908, thereafter, generation of a control signal and outputting of the control signal are performed. The control unit generates the control signal based on information of the recognition result by the recognition unit 126 and performs vehicle control such as brake control. Processing of Step S901 to S908 is repeatedly conducted at a predetermined cycle.

In a case of a camera using an image-capturing lens which has characteristics that an inflection point exists in a change rate of an incidence angle per image height, an area (third area 203) which has a doughnut-shape and in which resolution is low occurs in the captured image. Since the third area 203 exists, mismatching is likely to be caused in template matching in parallax calculation.

According to the present embodiment, image cutting-out processing and image reduction processing are performed in Step S904 to thereby make it possible to reduce the influence of the area (third area 203) in which resolution is low. Specifically, cutting-out processing is executed to the first area 201 surrounded by the third area 203 and reduction processing is executed to the entirety of the image. With regard to the first area 201 in which the target at a long distance is photographed, the parallax calculation is performed between two cut-out images 1101 and 1102, which are not influenced by the third area 203. Therefore, it is possible to prevent mismatching in template matching. On the other hand, reduction processing is executed in the entirety of the image and the portion of the third area 203 is eliminated or made small. For example, the target which is at the short distance and included in the second area 202 is a target displayed largely on the image and thus, even if the target is reduced to some extent, it does not influence on parallax calculation processing or the like. In such reduction processing, it is possible to make the portion of the third area 203 small while securing a size of the target in the short distance to some extent and thus, it is possible to prevent mismatching in template matching between two reduced images 1301 and 1302. Both first parallax calculation processing between the cut-out areas and second parallax calculation processing between the reduced images are performed to thereby make it possible to recognize an object even when the object exists in any area within the image.

The present invention is not limited to the embodiments described above and includes various modification examples. The embodiments described above are described in detail in order to make it easy to understand the present invention and the present invention is not necessarily limited to the embodiment provided with all configurations described above. A portion of a configuration of a certain embodiment may be replaced with a configuration of another embodiment. A configuration of another embodiment may be added to a certain embodiment. Another configuration may be added to, deleted from, or replaced with a portion of a configuration of each embodiment.

Modification Example 1

In the examples described above, an example which is applied to the stereo camera provided with two image-capturing units is described, but the present invention is not limited thereto. For example, the present invention may be applied to a monocular camera provided with a single lens having the same configuration as that described above. In this case, the operation unit (a portion corresponding to the operation unit 110) acquires a single image captured by the lens described above. The operation unit executes first image processing to the first area (which corresponds to first area 201) which targets a first distance range and executes second image processing to an area which includes at least the second area (which corresponds to second area 202) which targets a second distance range nearer than the first distance range. Second image processing is processing which is set based on information of a third area (which corresponds to third area 203) on the image generated caused by the inflection point in a change rate of an incidence angle per image height. First image processing may also be cutting-out processing for cutting out a predetermined area from the first area. Second image processing may be reduction processing for reducing the entirety of the image at a reduction rate which is set based on resolution of the third area. As image processing, processing of modification examples which will be described in the following may be used.

Modification Example 2

In the examples described above, although cutting-out processing and image reduction processing are executed, a combination of image processing is not limited to the combination of cutting-out processing and image reduction processing. For example, a different combination of image processing may be executed according to an application to be applied. As an example, cutting-out processing may be executed for the first area 201 and processing for making resolution uniform may be executed to the portion or the entirety of the image with predetermined resolution. Here, resolution uniformization processing corresponds to processing of the resolution adjustment unit described above. As an example, resolution uniformization processing may uniformize resolution within the image by lowering resolution of a predetermined area within the image. For example, the resolution adjustment unit may uniformize resolution within the image by lowering resolution at least one of the first area 201 positioned inside the third area 203 and the second area 202 positioned outside the third area 203. In this case, the predetermined resolution may be resolution which is set based on resolution of the third area 203 in advance. According to this configuration, resolution can be uniformized and occurrence of mismatching due to a difference in resolution can be prevented in template matching of parallax calculation.

Modification Example 3

In the examples described above, different image processing is executed respectively to two different areas of the first area 201 and the entirety of image, but a combination of areas which become an image processing target is not limited there. For example, first image processing (for example, cutting-out processing) may be executed to the first area 201 and second image processing (for example, reduction processing) may be executed to the second area 202. That is, different image processing may be executed, bordering the third area 203. As another example, the first image processing (for example, cutting-out processing) may be executed to the first area 201 and second image processing (for example, blur correction processing) may be executed to the third area 203. As an example, blur correction processing includes processing for generating an image by removing blur by performing inverse processing of the blur kernel, assuming that the current image is provided as a result of processing by a filter for forming blur in the image, which is referred to as a blur filter (so-called "blur kernel"). For example, in a case of a Gaussian filter where, the blur kernel is convolution processing which is a Gaussian function, and convolution is performed on the vicinity of each pixel of the original image for the pixel by convolution processing using a blur kernel having a Gaussian-shaped function so as to make it possible to calculate a pixel value of a new image and generate an image which is obtained by blurring the original image.

Performing of processing which is opposite to the blur kernel is inverse processing of convolution which is called deconvolution. Deconvolution is processing of estimating what kind of value was allocated to each pixel within the range of the blur kernel, before convolution by the blur kernel is performed.

When blur correction processing is performed on the entirety of the image, there is a possibility that bad influence may be exerted to the first area 201 and the second area 202 in which original resolution is high. Accordingly, in the present example, the image-capturing device extracts the portion of the third area 203 and blur correction processing is executed only to the third area 203. Here, resolution uniformization processing corresponds to processing of the resolution adjustment unit described above. For example, the resolution adjustment unit increases resolution of the third area 203 corresponding to the inflection point incidence angle (θs) by blur correction processing. With this, resolution of the third area 203 corresponding to the inflection point incidence angle (θs) and resolution of at least one of the first area 201 positioned inside the third area 203 and the second area 202 positioned outside the third area 203 coincide with each other or variation in resolution of these areas are made to approach each other. With this, it is possible to suppress occurrence of influence on processing of detection or recognition of an object due to characteristics of the lens.

Modification Example 4

In the examples described above, although information of the cut-out area and information of the reduction rate are fixed values which are set in advance, these pieces of information may be updated. For example, in a case where a lens or the like is reassembled in maintenance or the like of the image-capturing device, there is a possibility that a position of the lens is delicately changed and positions of the first to third areas 201 to 203 described above deviate. Accordingly, information of the cut-out area of the processing area information storing unit 136 and/or information of the reduction rate of the reduction information storing unit 137 may be updated by comparing the pieces of information with the image before calibration or the position of the lens is changed. Information of the reduction rate of the reduction information storing unit 137 may be updated according to the extent of decrease of resolution due to aged deterioration of respective constitutional elements of the image-capturing device.

The operation unit 110 described above can be implemented by a program code of software that implements the functions. In this case, a recording medium having stored the program code is provided in a system or an apparatus and a computer (CPU or MPU) of the system or the apparatus reads the program code stored in the recording medium. In this case, the program code itself read from the recording medium implements the functions of the embodiments described above and the program code itself or the recording medium having stored the program code constitutes the present invention. As a recording medium for supplying such a program code, for example, a flexible disk, a CD-ROM, a DVD-ROM, a hard disk, an optical disk, a magneto-optical disk, a CD-R, a magnetic tape, a non-volatile memory card, a ROM, or the like is used.

The process and the technique described herein are essentially irrelevant to any specific apparatus and can be mounted with any appropriate combination of components. Furthermore, various types of general-purpose devices may be utilized. In order to execute processing described herein, there may be a case where construction of a dedicated apparatus is beneficial. That is, a portion or the entirety of the operation unit 110 described above may be implemented by hardware using, for example, an electronic part such as an integrated circuit.

Furthermore, in the embodiment described above, control lines and information lines, which are considered necessary for explanation, are illustrated and those lines do not necessarily illustrate all of control lines and information lines needed for a product. It may be considered that almost all configurations are actually connected to each other.

REFERENCE SIGNS LIST

1: image-capturing device
100*a*: first image-capturing unit
100*b*: second image-capturing unit
101*a*, 101*b*: optical element
102*a*, 102*b*: image-capturing element
110: operation unit 117: synchronization signal transmitting unit
118a: reference image acquisition unit
118b: standard image acquisition unit
120: luminance correction unit
121: geometric correction unit
122: image cutting-out unit
123: image reduction unit
124: parallax calculation unit
125: distance calculation unit
126: recognition unit
131: reference image storing unit
132: standard image storing unit
133: processed image storing unit
134: luminance correction information storing unit
135: geometric correction information storing unit
136: processing area information storing unit
137: reduction information storing unit
201: first area on image (inside image area)
202: second area on image (outside image area)
203: third area on image (inflection point correspondence image area)
1001: reference image
1002: standard image
1101: first cut-out image
1102: second cut-out image
1201: reference image
1202: standard image
1203: first cut-out area
1204: second cut-out area
1301: first reduced image
1302: second reduced image

The invention claimed is:

1. An image processing device in which an image captured by at least one image-capturing device including a lens which has characteristics of having an inflection point of a change rate of an incidence angle per image height with respect to the incidence angle in a predetermined inflection point incidence angle is processed, the device comprising:

a resolution adjustment unit that adjusts resolution of an inflection point correspondence image area corresponding to the predetermined inflection point incidence angle and resolution of at least one of an inside image area positioned inside the inflection point correspondence image area and an outside image area positioned outside the inflection point correspondence image area.

2. The image processing device according to claim 1, wherein, in the lens, a magnification of a small incidence angle part in which an incidence angle is smaller than the predetermined inflection point incidence angle is set to be larger than a magnification of a large incidence angle part in which an incidence angle is larger than the predetermined inflection point incidence angle.

3. The image processing device according to claim 1, wherein the resolution adjustment unit reduces the entirety of the image by a reduction rate which is set according to the resolution of the inflection point correspondence image area.

4. The image processing device according to claim 1, wherein the resolution adjustment unit increases the resolution of the inflection point correspondence image area or decreases the resolution of at least one of the inside image area and the outside image area.

5. The image processing device according to claim 1, wherein the resolution adjustment unit
adjusts the resolution of at least the outside image area according to the resolution of the inflection point correspondence image area with respect to each of two images captured by the two image-capturing devices, and
calculates parallax information of the inflection point correspondence image area and the outside image area using the two images in which the resolution of at least the outside image area is adjusted.

* * * * *